United States Patent
Adoum et al.

(10) Patent No.: US 8,240,945 B2
(45) Date of Patent: Aug. 14, 2012

(54) AXISYMMETRIC PARTS EQUIPPED WITH DUST REMOVAL GROOVES

(75) Inventors: Melissa Adoum, Toulouse (FR); Jerome Dubost, La Salvetat Saint Gilles (FR)

(73) Assignee: Airbus Operations SAS, Toulouse (FR)

( * ) Notice: Subject to any disclaimer, the term of this patent is extended or adjusted under 35 U.S.C. 154(b) by 111 days.

(21) Appl. No.: 12/138,499

(22) Filed: Jun. 13, 2008

(65) Prior Publication Data
US 2009/0028635 A1    Jan. 29, 2009

(30) Foreign Application Priority Data
Jun. 13, 2007 (FR) ...................... 07 55719

(51) Int. Cl.
*F16D 1/00* (2006.01)
(52) U.S. Cl. ........................ 403/365; 403/371
(58) Field of Classification Search .................. 403/345, 403/365–371
See application file for complete search history.

(56) References Cited

U.S. PATENT DOCUMENTS

| | | | | |
|---|---|---|---|---|
| 1,877,495 A | * | 9/1932 | Cater | 384/97 |
| 1,961,029 A | * | 5/1934 | Benedek | 384/287 |
| 4,258,808 A | * | 3/1981 | Peetz et al. | 175/394 |
| 4,456,266 A | * | 6/1984 | Heinold | 277/430 |
| 4,748,862 A | * | 6/1988 | Johnston | 74/7 R |
| 5,498,007 A | * | 3/1996 | Kulkarni et al. | 277/400 |
| 2007/0003176 A1 | * | 1/2007 | Poloni et al. | 384/418 |

FOREIGN PATENT DOCUMENTS

| | | |
|---|---|---|
| EP | 1484516 A1 | 12/2004 |
| GB | 2226801 A | 7/1990 |

OTHER PUBLICATIONS

Search Report dated Jan. 22, 2008 for FR 0755719.

* cited by examiner

*Primary Examiner* — Victor MacArthur
(74) *Attorney, Agent, or Firm* — Perman & Green, LLP

(57) ABSTRACT

An assembly of at least two concentric axisymmetric parts intended to work at least in tension, wherein at least one axisymmetric part is equipped with at least one dust removal groove, the groove being cut from a plain surface of the first axisymmetric part in contact with a plain surface of a concentric second axisymmetric part so as to open toward the plain surface of the second axisymmetric part, the groove being capable of collecting the dust that lies in the area of contact between the two axisymmetric parts.

5 Claims, 2 Drawing Sheets

AXISYMMETRIC PARTS EQUIPPED WITH DUST REMOVAL GROOVES

BACKGROUND

1. Field

The disclosed embodiments relate to an assembly of at least two concentric axisymmetric parts capable of removing the dust that collects between said concentric parts.

2. Brief Description of Related Developments

In numerous technical fields, such as the field of connections and attachments, it is necessary for two concentric parts, such as a spindle and a ring or a hollow cylinder, to be nested one inside the other for example in order to strengthen a connection. The two concentric parts are mounted in such a way as to ensure good transfer of load. However, in order to allow these two parts to be fitted one inside the other, it is necessary to provide a small amount of clearance between said parts, it being possible for this small clearance to cause an unwanted relative rotational or translational movement while said parts are in use. The unwanted friction may file away the contact surface of each of these two parts, creating dust which collects between the two parts. This dust may abrade the parts, making the effect of wear of said parts far worse. Likewise, depending on where the two concentric parts are fitted together, it is possible that dust may collect on the contact surfaces along which the two parts contact each other even while the said parts are being fitted together.

SUMMARY

The disclosed embodiments seek to guard the parts of an assembly of concentric axisymmetric parts against the wear brought about by dust that collects between the said parts.

To do that, the disclosed embodiments propose to equip at least one of the concentric parts of the assembly of at least two concentric parts with a dust removal system capable of collecting the dust from the region of contact between the said part and a concentric other part in such a way that said dust no longer lies between said concentric parts. The removal system according to the disclosed embodiments may also carry said dust toward the outside of the concentric parts. The removal system according to the disclosed embodiments comprises at least one channel cut from the plain surface of one of the two concentric parts so that it opens toward the surface of another concentric part. This channel has a volume capable of collecting the dust that lies between the two plain surfaces. The unwanted relative movements of the two concentric parts concerned cause the dust lying between the two contacting plain surfaces to move as a result of friction until it drops into the channel. The channel may have an open end, that is to say an end which coincides with an end of the concentric part, so that it opens to the outside. Thus, the dust collected in the channel can be removed from the concentric part at the open end. Advantageously, when it is foreseen that, for example because they have a coating liable to become abraded, there is a risk that the two concentric parts will create a significant amount of dust, or when the concentric parts are to be used in a very dusty environment, provision is made for each of the contacting plain surfaces to be equipped with a channel. When the concentric parts are mounted one inside the other, the channels can then either be offset from one another or facing one another so that they open into one another.

The subject of the disclosed embodiments are therefore an assembly of at least two concentric axisymmetric parts intended to work at least in tension, characterized in that at least one first axisymmetric part is equipped with at least one dust removal groove, the said groove being cut from a plain surface of the first axisymmetric part in contact with a plain surface of a concentric second axisymmetric part so as to open toward the plain surface of the second axisymmetric part, said groove being capable of collecting the dust that lies in the area of contact between the two axisymmetric parts.

The concentric axisymmetric parts are, for example, a spindle and a hollow cylinder and/or a ring.

The removal groove is a volume cut into the thickness of the part.

A plain surface is to be understood to mean a surface with no changes in level.

Contact between the plain surfaces of the two concentric parts means that any translational and/or rotational relative movement of the parts with respect to one another causes the two plain surfaces to rub together. The rubbing or friction may cause dust but in any event causes said dust, be it created dust and/or residual dust, to move along until it reaches the groove which collects it in the hollow volume thereof.

According to some exemplary embodiments, it is possible to envision all or some of the following additional features:

- at least one groove is a longitudinal groove, that is to say a groove substantially parallel to the axis of rotation of the parts. The longitudinal groove may be inclined slightly with respect to said axis. An unwanted relative rotational movement of the two parts causes the dust to move in a circle, that is to say substantially around the perimeter of the parts. The dust reaches the longitudinal groove and falls into it;
- at least one groove is a circular groove, that is to say is a groove which extends over at least a partial perimeter of the part concerned. As a preference, the groove extends over the complete periphery, but it is just as easy to imagine a groove in the form of a circular arc, that is to say a groove that does not extend over the entire perimeter of the part. An unwanted relative translational movement of the two parts causes the dust to move along parallel to the longitudinal axis. The dust reaches the circular groove and falls into it;
- at least one groove is a helical groove, one axis of rotation of which coincides with the axis of revolution of the parts. A groove such as this is able to collect dust both when the parts are subjected to unwanted relative rotational movements and when they are subjected to unwanted relative translational movements.
- at least one end of one groove opens at one end of the first axisymmetric part so as to allow the collected dust to be removed to the outside of said assembly;
- the open end of the groove forms a widened opening, such as a cup opening to the outside of the part. Under certain conditions, for example in the case of an unwanted relative rotational movement at a high rotational speed, the presence of this cup is able to draw air that pulls the dust toward the outside;
- the groove surface represents at most 10% of the total surface area of the first axisymmetric part in contact with the plain surface of the second axisymmetric part.

A total surface area is to be understood to mean the grooved surface area and the plain surface area of the surface concerned. The grooved surface area is to be understood to mean the hollowed-out area.

It is thus possible to ensure that there will be a large enough working surface area for the assembly of concentric parts to be able to operate in tension. If the grooved surface area is too great by comparison with the plain surface area then the part concerned will be too greatly weakened to be able to withstand the loads that it is supposed to be able to withstand.

The disclosed embodiments will be better understood from reading the description which follows and from studying the accompanying figures. These are given by way of entirely nonlimiting indication of the disclosed embodiments. The figures depict:

DETAILED DESCRIPTION OF THE DRAWINGS

Figure 1:
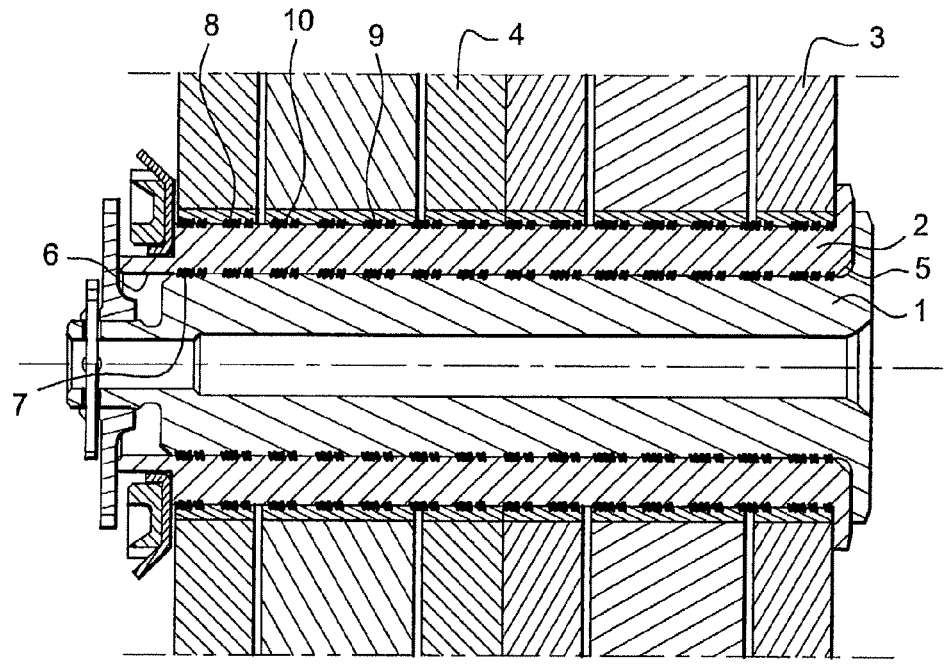
FIG. 1: a depiction in longitudinal section of a spindle mounted in a hollow circular part, itself surrounded by two rings, showing the regions in which dust is likely to collect.

FIG. 1 depicts a central spindle 1 mounted in a peripheral spindle 2 itself surrounded by two rings 3 and 4 adjacent to one another.

Thus, FIG. 1 depicts three concentric elements 1, 2 and 3, 4. The external surface 5 of the central part 1 is in contact with the internal surface 6 of the peripheral part 2, the two surfaces 5, 6 being liable to rub against one another. Likewise, the external surface 8 of the peripheral part 2 is in contact with the internal surface 9 of the rings 3, 4, said surfaces being liable to rub against one another.

Internal is to be understood to mean facing toward the axis of rotation A of said concentric parts 1, 2, 3, 4, as opposed to external.

The region 7 of contact between the central 1 and peripheral 2 parts and the region 10 of contact between the peripheral part 2 and the rings 3, 4 are liable to collect dust which may prove detrimental to the life of said parts. Thus, in the case of parts that have a coating to improve sliding and/or protect against corrosion, such as a titanium nitride coating for example, unwanted friction between these parts may cause the coating to be torn away gradually in the form of abrasive dust.

The disclosed embodiments anticipate forming at least one dust removal groove 11 on at least one of the concentric parts 1, 2, 3, 4, said groove 11 having a volume opening onto a contact surface 7, 10. As a preference, at least one groove 11 is formed on at least one surface of each of the contact regions 7 and 10. Thus, for example, provision is made for at least one groove 11 to be formed on the external surface 5 of the central part 5 and for at least one groove 11 to be formed on the internal surface 9 of the rings 3, 4, the internal 6 and external 8 surfaces of the peripheral part 2 being completely plain.

Figure 2:
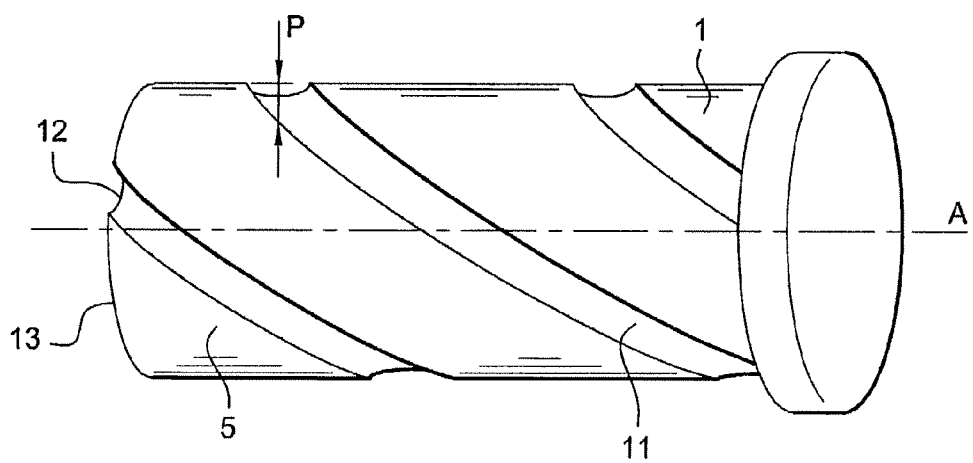
FIG. 2: a schematic depiction of a solid cylinder equipped on its external surface with removal grooves according to the disclosed embodiments.

For example, as has been depicted in FIG. 2, the solid cylinder 1 is equipped on its external surface 5 intended to face toward the internal surface 6 of the hollow cylinder 2, with grooves 11 cut into the thickness of said central part 1. The thickness is to be understood to mean the dimension of the part that lies radially with respect to the axis A. A bottom end 12 of the groove 11 (just one of which is visible in FIG. 2) opens to the outside of the central part 1 at an end 13 of the said central part 1. Thus, dust that has collected in the volume of the grooves 11 can be removed to the outside of the central part 1 via the open end 12. That is particularly advantageous when the dust is the result of abrasion of the contacting concentric parts and is therefore formed constantly while said concentric parts are in use.

Advantageously, the depth P of said grooves 11 is dependent on the material of which the central part 1 is made and also possibly on the material of which the coating is made and on the loads that are going to be transmitted through the assembly of concentric parts comprising the said central parts 1. Depth is to be understood to mean the dimension of the groove 11 from the plain external surface 5 of the part 1 as far as the base of the groove 11. The depth-to-radius ratio (P/R) of the part 1 ranges between 5% and 20% and preferably between 10% and 16%.

The grooves 11 are longitudinal grooves in that they extend along a length L of the central part 1. Length is to be understood to mean the dimension of the central part 1 extending parallel to the axis A of the cylindrical part 1. Advantageously, the grooves 11 are inclined with respect to the longitudinal axis A of the cylindrical part 1 so that dust can be collected in the event of unwanted relative rotational and translational movements.

Figure 3A:
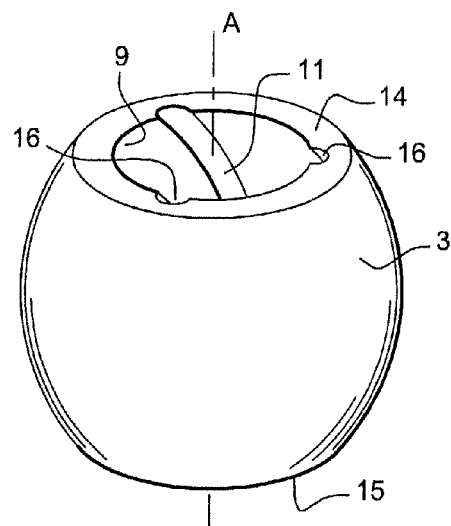
FIGS. 3a, 3b and 3c: schematic depictions of a ring equipped on an internal surface with removal grooves according to various exemplary embodiments.
Figure 3B:
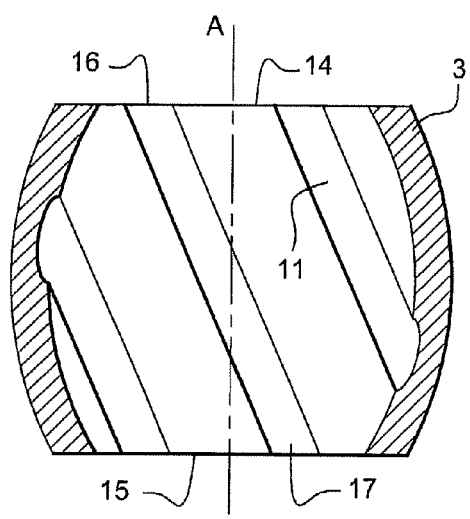
Figure 3C:
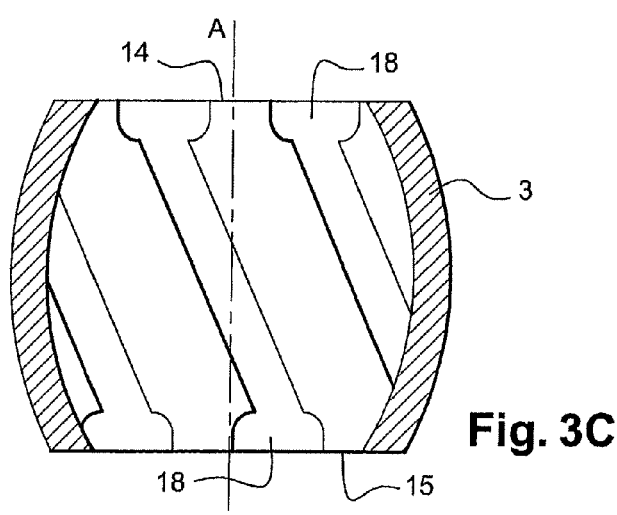

FIGS. 3A, 3B and 3C depict a ring 3 the internal surface 9 of which is intended to be in contact 10 with the external surface 8 of a concentric internal part 2 (FIG. 1).

Longitudinal grooves 11 run from a first end 14 to a second end 15 of the said ring 3 so that each has two open ends 16, 17.

In the exemplary embodiment depicted in FIG. 3C, the open ends 16, 17 form a widening 18 or cup of a greater cross-sectional area than the remainder of the groove 11.

The invention claimed is:

1. An assembly comprising:
 a first part having an axis and an outer surface;
 at least one second part having in inner surface, the at least one second part assembled with the first part in an axisymmetric relation to form a connection for the transmission of forces through the assembly, said outer surface and said inner surface forming an interface, wherein the tolerance between said outer surface and said inner surface is sufficiently close that relative motion between said outer surface and said inner surface at the interface results in abrasion due to friction; and
 further wherein one of the inner and outer surfaces at the interface is constructed with at least one dust removal groove, the dust removal groove operating to collect dust that accumulates at the interface during the allowed minimum relative movement between the first part and the at least one second part at the interface,
 and wherein at least one end of one groove opens at a longitudinal end of the first axisymmetric part so as to allow the collected dust to be removed to the outside of said assembly, the opening at the longitudinal end having a greater cross-sectional area than a remainder of the groove.

2. An assembly according to claim 1, wherein the at least one groove is a longitudinal groove.

3. An assembly according to claim 1, wherein at least one groove is a circular groove.

4. An assembly according to claim 1, wherein at least one groove is a helical groove.

5. An assembly according to claim 1, wherein the groove surface represents at most 10% of the surface area of the first axisymmetric part in contact with the plain surface of the second axisymmetric part.

* * * * *